US012567624B2

(12) United States Patent
Kuo et al.

(10) Patent No.: US 12,567,624 B2
(45) Date of Patent: Mar. 3, 2026

(54) THERMAL INSULATING JOINTS FOR TRACTION BATTERY PACKS

(71) Applicant: FORD GLOBAL TECHNOLOGIES, LLC, Dearborn, MI (US)

(72) Inventors: Chung-Hsing Kuo, Ann Arbor, MI (US); Yongcai Wang, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 676 days.

(21) Appl. No.: 17/946,192

(22) Filed: Sep. 16, 2022

(65) Prior Publication Data

US 2024/0097239 A1     Mar. 21, 2024

(51) Int. Cl.
*H01M 10/658* (2014.01)
*B60L 50/64* (2019.01)
*H01M 10/6555* (2014.01)

(52) U.S. Cl.
CPC ........... *H01M 10/658* (2015.04); *B60L 50/64* (2019.02); *H01M 10/6555* (2015.04); *H01M 2220/20* (2013.01)

(58) Field of Classification Search
CPC ............ H01M 10/613; H01M 10/615; H01M 10/617; H01M 10/625; H01M 10/6551; H01M 10/6552; H01M 10/6553; H01M 10/6554; H01M 10/6555; H01M 10/6556; H01M 10/6557; H01M 10/658
See application file for complete search history.

(56) References Cited

U.S. PATENT DOCUMENTS

| | | | |
|---|---|---|---|
| 8,747,015 B1* | 6/2014 | Polewarczyk ........ | F16B 33/002 |
| | | | 403/384 |
| 10,823,290 B2 | 11/2020 | Miller et al. | |
| 11,335,963 B2 | 5/2022 | Negrete et al. | |
| 2018/0138559 A1* | 5/2018 | Omura .................... | B60L 50/66 |
| 2018/0209748 A1 | 7/2018 | Thomas et al. | |
| 2020/0212397 A1* | 7/2020 | Wang ................. | H01M 50/184 |
| 2022/0069386 A1 | 3/2022 | Salonen | |

FOREIGN PATENT DOCUMENTS

CN        111540853 A     8/2020

* cited by examiner

*Primary Examiner* — Matthew W Van Oudenaren
(74) *Attorney, Agent, or Firm* — David B. Kelley; Carlson, Gaskey & Olds, P.C.

(57) ABSTRACT

Exemplary traction battery pack designs for use in electrified vehicles may include a thermal insulating joint configured to isolate a heat transfer path at one or more structural connections between an enclosure tray and a battery internal structure (e.g., heat exchanger plate, cross member, etc.) of the traction battery pack. The thermal insulating joint may include a first thermal insulation component and a second thermal insulation component disposed on opposite sides of the battery internal structure. The thermal insulation components cooperate to block the heat transfer path across the structural connection, thereby insulating the battery internals from an ambient surrounding of the traction battery pack.

20 Claims, 5 Drawing Sheets

THERMAL INSULATING JOINTS FOR TRACTION BATTERY PACKS

TECHNICAL FIELD

This disclosure relates generally to electrified vehicle traction battery packs, and more particularly to thermal insulating joints designed for isolating heat transfer paths created by structural connections between outer enclosure structures and cell modules, internal components, etc., so as to minimize the influence of ambient temperatures.

BACKGROUND

A high voltage traction battery pack typically powers an electric machine and other electrical loads of an electrified vehicle. The traction battery pack includes a plurality of battery cells and various other battery internal components that are housed inside an outer enclosure assembly for supporting the electric propulsion of the electrified vehicle. Battery cell performance and life can be influenced by ambient conditions, especially for traction battery packs that are mounted to the vehicle underbody.

SUMMARY

A thermal insulating joint for a traction battery pack according to an exemplary aspect of the present disclosure includes, among other things, an outer enclosure assembly including an enclosure tray, a battery internal structure, and a fastener assembly configured to mount the battery internal structure to the enclosure tray. The fastener assembly includes a first thermal insulation component and a second thermal insulation component.

In a further non-limiting embodiment of the foregoing thermal insulating joint, the battery internal structure is a heat exchanger plate that is arranged to thermally manage a battery array of the traction battery pack.

In a further non-limiting embodiment of either of the foregoing thermal insulating joints, the battery internal structure is a rigid cross member that is positioned between adjacent battery arrays of the traction battery pack.

In a further non-limiting embodiment of any of the foregoing thermal insulating joints, the fastener assembly includes a bolt having a shaft received through each of the enclosure tray, the first thermal insulation component, the battery internal structure, and the second thermal insulation component.

In a further non-limiting embodiment of any of the foregoing thermal insulating joints, a head of the bolt is configured to interface with the enclosure tray.

In a further non-limiting embodiment of any of the foregoing thermal insulating joints, the fastener assembly includes a washer arranged between the head and the enclosure tray.

In a further non-limiting embodiment of any of the foregoing thermal insulating joints, the shaft of the bolt is secured by a nut of the fastener assembly.

In a further non-limiting embodiment of any of the foregoing thermal insulating joints, at least a portion of the shaft, the nut, and the second thermal insulation component is covered by a cap of the fastener assembly.

In a further non-limiting embodiment of any of the foregoing thermal insulating joints, the first thermal insulation component is positioned on a first side of the battery internal structure, and the second thermal insulation component is positioned on a second side of the battery internal structure.

In a further non-limiting embodiment of any of the foregoing thermal insulating joints, the first thermal insulation component is a washer, and the second thermal insulation component is a flanged collar.

In a further non-limiting embodiment of any of the foregoing thermal insulating joints, the first thermal insulation component spaces the battery internal structure apart from a floor of the enclosure to establish an air gap therebetween.

In a further non-limiting embodiment of any of the foregoing thermal insulating joints, each of the first thermal insulation component and the second thermal insulation component includes an epoxy glass or a fluoro resin (PTFE).

A thermal insulating joint for a traction battery pack according to another exemplary aspect of the present disclosure includes, among other things, an outer enclosure assembly including an enclosure tray, a heat exchanger plate, and a fastener assembly configured to mount the heat exchanger plate to a floor of the enclosure tray. The fastener assembly includes a first thermal insulation component disposed on first side of the heat exchanger plate and a second thermal insulation component disposed on a second side of the heat exchanger plate.

In a further non-limiting embodiment of the foregoing thermal insulating joint, the first thermal insulation component is a washer, and the second thermal insulation component is a flanged collar.

In a further non-limiting embodiment of either of the foregoing thermal insulating joints, the first thermal insulation component spaces the heat exchanger plate above the floor to establish an air gap therebetween.

In a further non-limiting embodiment of any of the foregoing thermal insulating joints, the fastener assembly includes a bolt having a shaft received through each of the floor, the first thermal insulation component, the heat exchanger plate, and the second thermal insulation component.

In a further non-limiting embodiment of any of the foregoing thermal insulating joints, the fastener assembly includes a washer arranged between a head of the bolt and the floor.

In a further non-limiting embodiment of any of the foregoing thermal insulating joints, the fastener assembly includes a nut that is received over the shaft of the bolt.

In a further non-limiting embodiment of any of the foregoing thermal insulating joints, the fastener assembly includes a cap arranged to cover at least a portion of the shaft, the nut, and the second thermal insulation component.

In a further non-limiting embodiment of any of the foregoing thermal insulating joints, each of the first thermal insulation component and the second thermal insulation component includes an epoxy glass or a fluoro resin (PTFE).

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include a thermal insulating joint configured to block a heat transfer path at one or more structural connections between an enclosure tray and a battery internal structure (e.g., heat exchanger plate, cross member, etc.) of the traction battery pack. The thermal insulating joint may include a first thermal insulation component and a second thermal insulation component disposed on opposite sides of the battery internal structure. The thermal insulation components cooperate to block the heat transfer path across the structural connection, thereby insulating the battery internals from an ambient surrounding of the traction battery pack. These and other features are discussed in greater detail in the following paragraphs of this detailed description.

Figure 1:
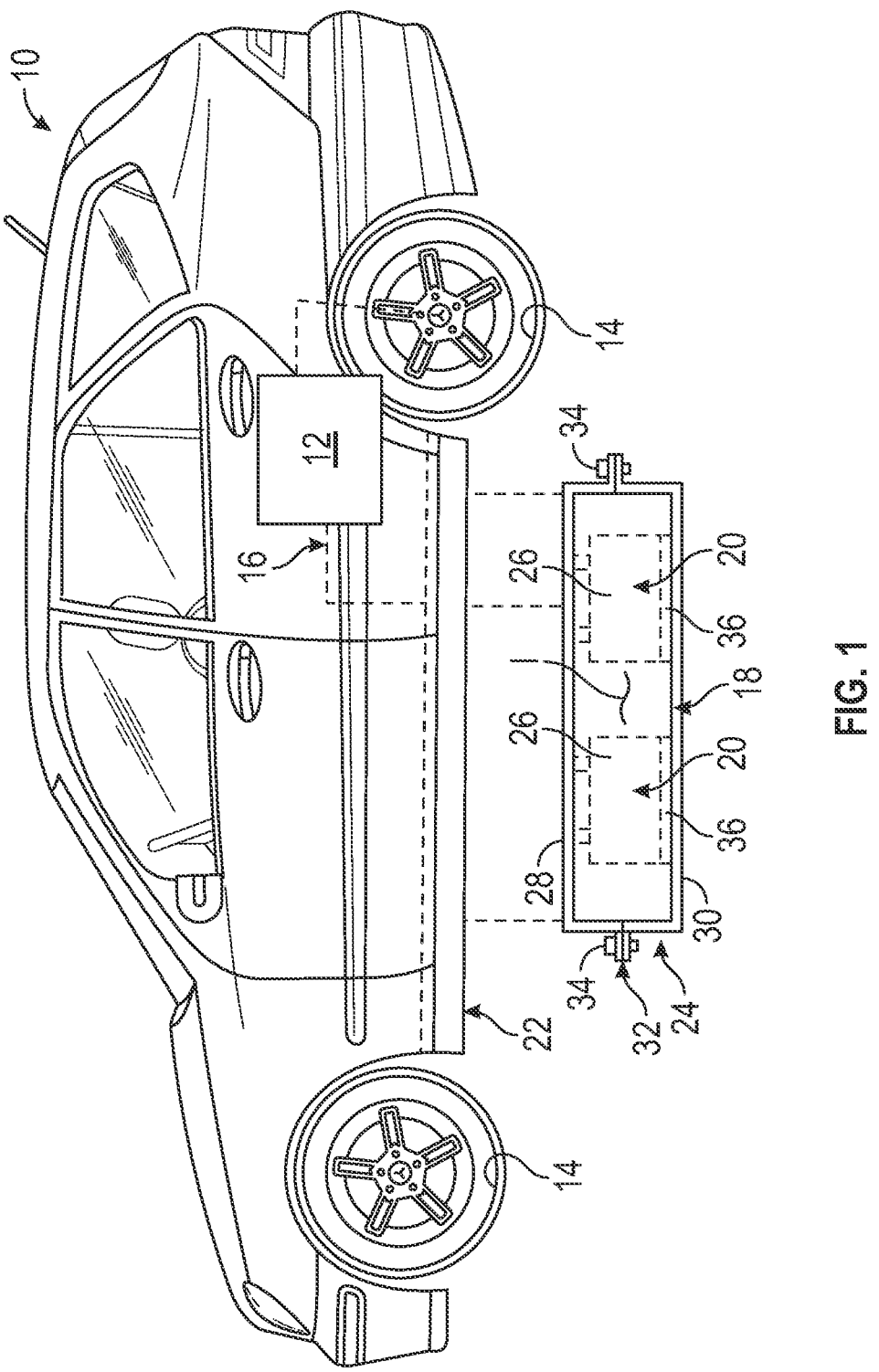
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In the illustrated embodiment, the electrified vehicle 10 is a sport utility vehicle (SUV). However, the electrified vehicle 10 could alternatively be a car, a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10

A voltage bus 16 may electrically couple the electric machine 12 to a traction battery pack 18. The traction battery pack 18 is an exemplary electrified vehicle battery. The traction battery pack 18 may be a high voltage traction battery pack that includes one or more battery arrays 20 (i.e., battery assemblies or groupings of rechargeable battery cells 26) capable of outputting electrical power to power the electric machine 12 and/or other electrical loads of the electrified vehicle 10. Other types of energy storage devices and/or output devices could alternatively or additionally be used to electrically power the electrified vehicle 10.

The battery cells 26 may be stacked side-by-side along a stack axis to construct a grouping of battery cells 26, sometimes referred to as a "cell stack." In the highly schematic depiction of FIG. 1, the battery cells 26 are stacked in a direction into the page to construct each battery array 20, and thus the battery arrays 20 extend in cross-car direction. However, other configurations may also be possible.

The total number of battery arrays 20 and battery cells 26 provided within the traction battery pack 18 is not intended to limit this disclosure. In an embodiment, the battery cells 26 of each battery array 20 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The traction battery pack 18 may be secured to an underbody 22 of the electrified vehicle 10. However, the traction battery pack 18 could be located elsewhere on the electrified vehicle 10 within the scope of this disclosure.

An outer enclosure assembly 24 may house each battery array 20 of the traction battery pack 18. The outer enclosure assembly 24 may be a sealed enclosure and may embody any size, shape, and configuration within the scope of this disclosure. In an embodiment, the outer enclosure assembly 24 includes an enclosure cover 28 and an enclosure tray 30. Together, the enclosure cover 28 and the enclosure tray 30 may establish an interior I for housing the battery arrays 20 and other battery internal components (e.g., bussed electrical center, battery electric control module, wiring, connectors, etc.) of the traction battery pack 18.

During assembly of the traction battery pack 18, the enclosure cover 28 may be secured to the enclosure tray 30 at an interface 32 therebetween. The interface 32 may substantially circumscribe the interior I. In some implementations, mechanical fasteners 34 may be used to secure the enclosure cover 28 to the enclosure tray 30, although other fastening methodologies (adhesion, etc.) could also be suitable for this purpose.

One or more heat exchanger plates 36 may also be housed within the interior I of the outer enclosure assembly 24 of the traction battery pack 18. The heat exchanger plates 36 are sometimes referred to as "cold plates" or "cold plate assemblies." In an embodiment, one or more of the battery arrays 20 may be positioned relative to each heat exchanger plate 36. In some implementations, multiple battery arrays 20 may share a common heat exchanger plate 36. In other implementations, each battery array 20 may interface with its own dedicated heat exchanger plate 36.

The heat exchanger plates 36 may be part of a liquid cooling system that is configured for thermally managing the battery cells 26 of each battery array 20. For example, heat may be generated and released by the battery cells 26 during charging operations, discharging operations, or other conditions. It may be desirable to remove the heat from the battery arrays 20 to optimize capacity, life, and performance of the battery cells 26.

The heat exchanger plates 36 may be configured to conduct the heat out of the battery cells 26. In other words, the heat exchanger plates 36 may operate as heat sinks for removing heat from the heat sources (i.e., the battery cells 26). The heat exchanger plates 36 could alternatively be employed to heat the battery cells 26, such as during relatively cold ambient conditions.

Each heat exchanger plate 36 may be mechanically secured (e.g., bolted) to the enclosure tray 30 at a plurality of structural connections. At each structural connection, a fastener (e.g., bolt) typically extends through an opening formed in the enclosure tray 30, thereby creating a heat transfer path where thermal energy can be lost to the ambient surroundings of the traction battery pack 18. The thermal energy losses can cause undesired or uneven cell temperatures, thereby influencing battery life or performance. This disclosure is therefore directed to thermal insulating joints designed for blocking the heat transfer path across structural connections within the traction battery pack 18.

Figure 2:
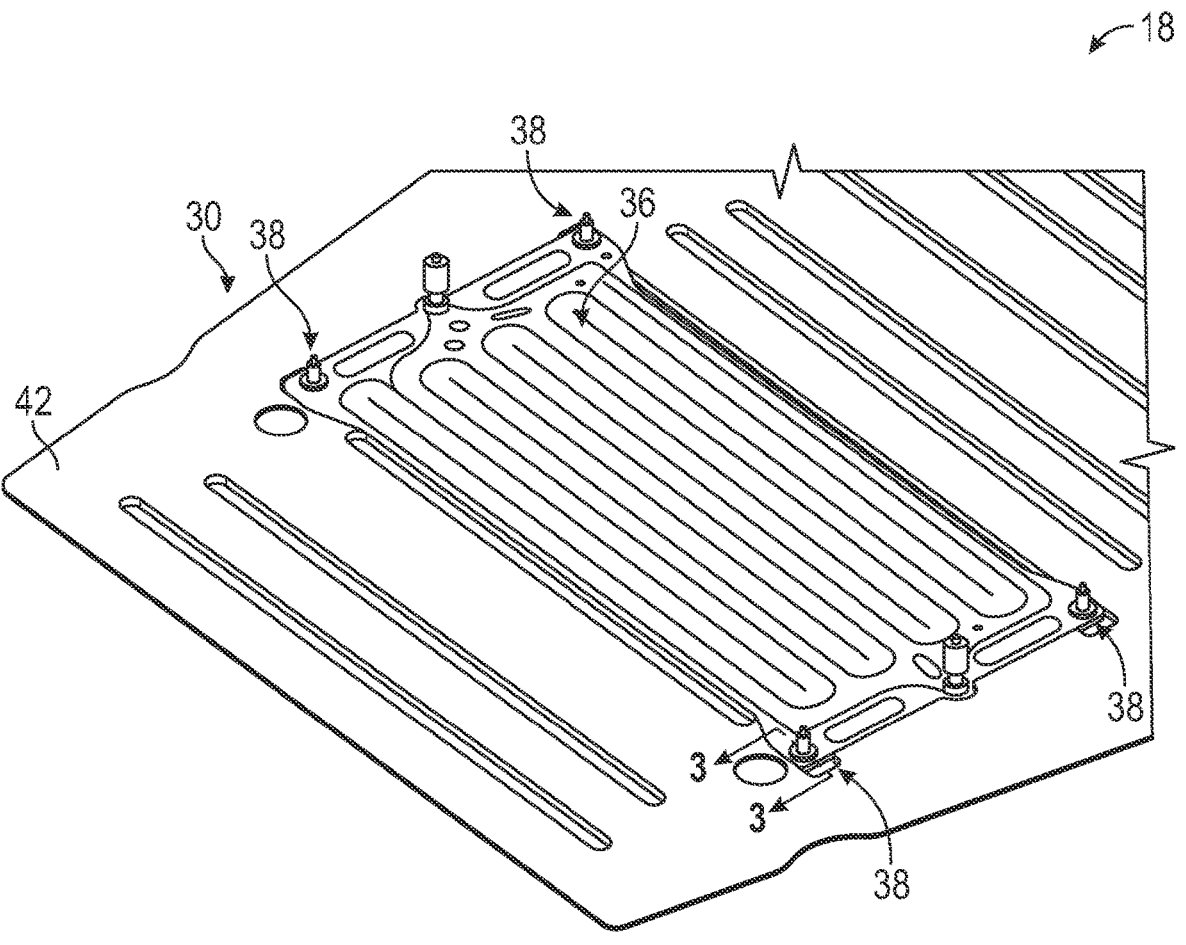
FIG. 2 is a perspective view of a traction battery pack with select portions removed in order to better illustrate portions of thermal insulating joint of the traction battery pack.
Figure 3:
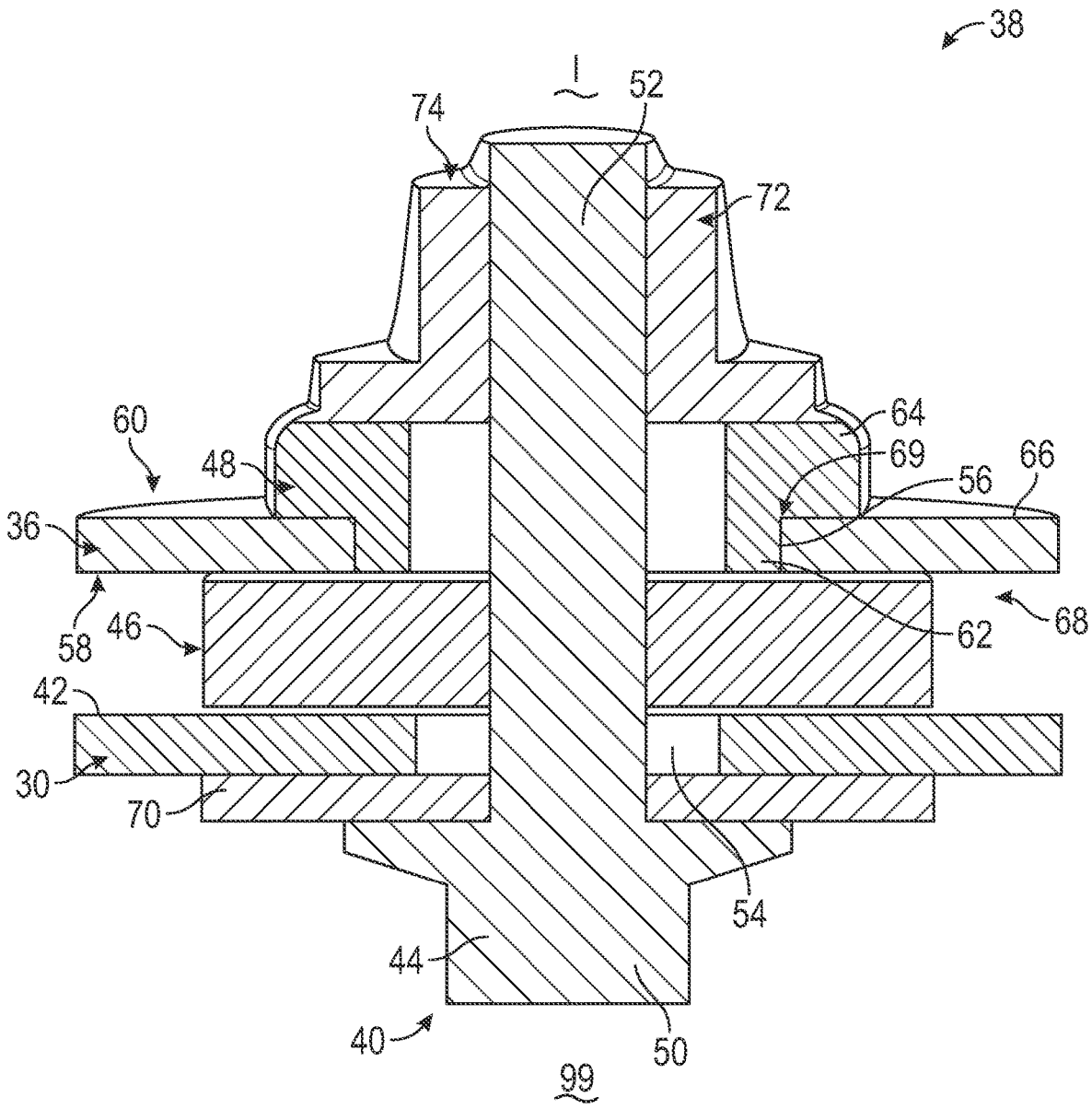
FIG. 3 is a cross-sectional view through section 3-3 of FIG. 2.
Figure 4:
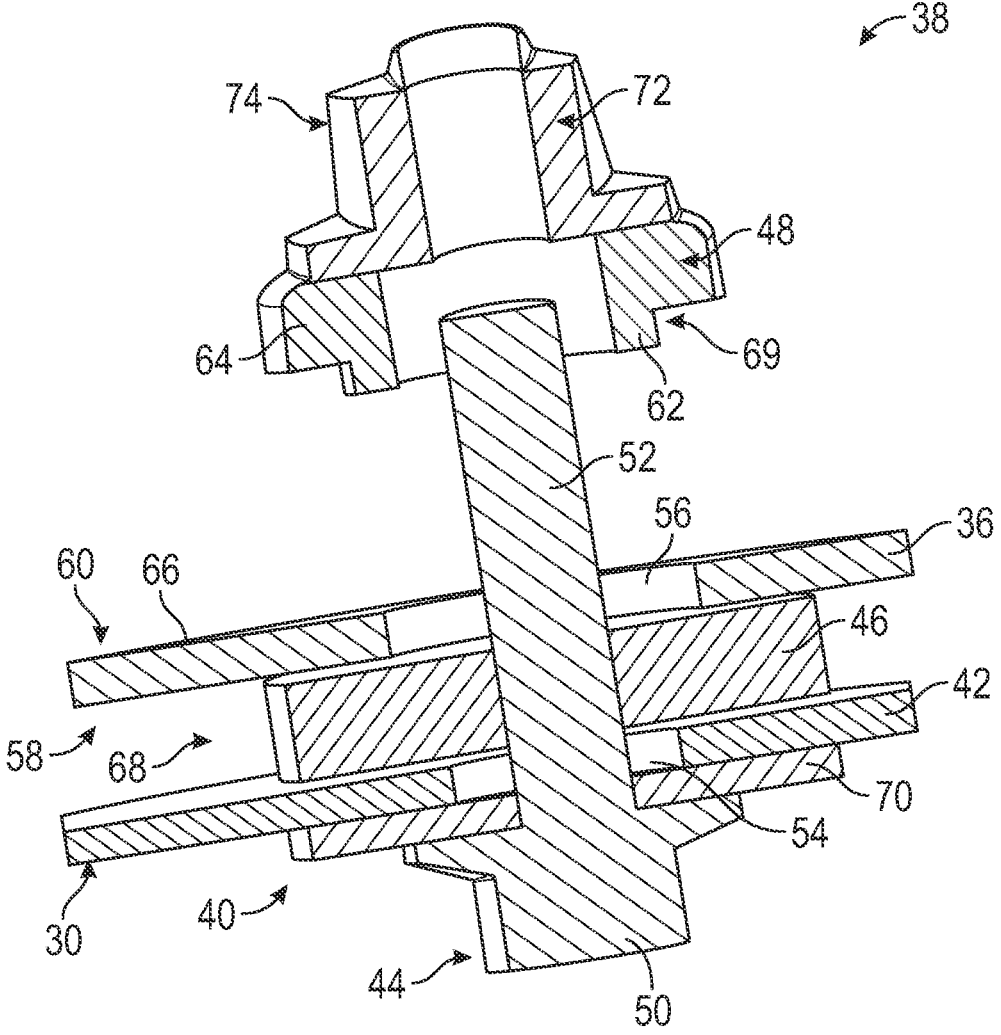
FIG. 4 is an exploded view of the thermal insulating joint of FIGS. 2 and 3.

FIGS. 2, 3, and 4 illustrate an exemplary thermal insulating joint 38 that can be utilized within a traction battery pack, such as the traction battery pack 18 of FIG. 1, for example. In an embodiment, the thermal insulating joint 38 includes an enclosure tray 30, a heat exchanger plate 36, and a fastener assembly 40 for securing the heat exchanger plate 36 to a bottom cover or floor 42 of the enclosure tray 30. Accordingly, in this embodiment, the thermal insulating joint 38 is established between the floor 42 of the enclosure tray 30 and a battery internal component (e.g., the heat exchanger plate 36). Notably, as depicted in FIG. 2, multiple thermal insulating joints 38 (e.g., one for each structural connection between the enclosure tray 30 and the heat exchanger plate 36) may be provided.

The fastener assembly 40 may include a bolt 44, a first thermal insulation component 46, and a second thermal insulation component 48. The first thermal insulation component 46 may be positioned on a first side 58 of the heat exchanger plate 36, and the second thermal insulation component 48 may be positioned on a second side 60 of the heat exchanger plate 36. The first side 58 may be closer to the floor 42 than the second side 60. Together, the first thermal insulation component 46 and second thermal insulation component 48 may function to block the heat transfer path across the thermal insulating joint 38, thereby reducing or even eliminating absorption/dissipation of thermal energy from/to an ambient surrounding 99 of the traction battery pack 18.

The bolt 44 may include a head 50 and a shaft 52 that extends from the head 50. The shaft 52 may be received through a first opening 54 formed through the floor 42 of the enclosure tray 30 and a second opening 56 formed through the heat exchanger plate 36. The bolt 44 may be a metallic (e.g., steel) component. However, other materials may also be suitable.

The first thermal insulation component 46 may be positioned between the floor 42 and the heat exchanger plate 36 and may circumscribe a portion of the shaft 52 of the bolt 44. At this location, the first thermal insulation component 46 may act as a standoff for spacing the heat exchanger plate 36 apart from the floor 42, thereby establishing an air gap 68 therebetween. The air gap 68 may further serve to insulate the heat exchanger plate 36 from the floor 42, which is exposed to the ambient surrounding 99.

In an embodiment, the first thermal insulation component 46 is configured as a washer. However, other configurations are further contemplated within the scope of this disclosure.

The second thermal insulation component 48 may be at least partially received within the second opening 56 of the heat exchanger plate 36 and may circumscribe another portion of the shaft 52 of the bolt 44. In an embodiment, the second thermal insulation component 48 is configured as a flanged collar that includes a collar portion 62 and a flange portion 64 that establish a stepped profile 69. The collar portion 62 may be received within the second opening 56, and the flange portion 64 may extend over top of an outer surface 66 of the heat exchanger plate 36 to help retain the position of the second thermal insulation component 48 within the second opening 56. However, other configurations are contemplated within the scope of this disclosure.

The first thermal insulation component 46 and the second thermal insulation component 48 may be made from insulating, low conductivity materials. Exemplary materials may include plastic laminate materials with low thermal conductively fillers (e.g., epoxy glass, fluoro resin (PTFE), etc.). However, other insulation materials, including but not limited to polydiacetylene polymers, thermochromic polymers, polycarbonates (PC), and polymethyl methacrylates (PMMA), may also be suitable within the scope of this disclosure.

The fastener assembly 40 may further include a washer 70, a nut 72, and a cap 74. The washer 70 may be positioned between the head 50 of the bolt 44 and the floor 42. The washer 70 may be made of a metallic material, such as steel, for example. However, other materials could alternatively be utilized.

The nut 72 may be received over an end portion of the shaft 52 for securing the bolt 44 in place. The nut 72 may be made of a metallic material, such as steel, for example. However, other materials could alternatively be utilized.

The cap 74 may be received over portions of the shaft 52, the nut 72, and the second thermal insulation component 48 for further blocking the thermal transfer path across the thermal insulating joint 38. The cap 74 may be made of a thermally insulating material, such as rubber, for example. However, other materials could alternatively be utilized.

The bolt 44 may be inserted across the thermal insulating joint 38 using a bottom-up approach. When inserted, the shaft 52 of the bolt 44 may be received through each of the washer 70, the floor 42, the first thermal insulation component 46, the heat exchanger plate 36, the second thermal insulation component 48, and the nut 72.

Figure 5:
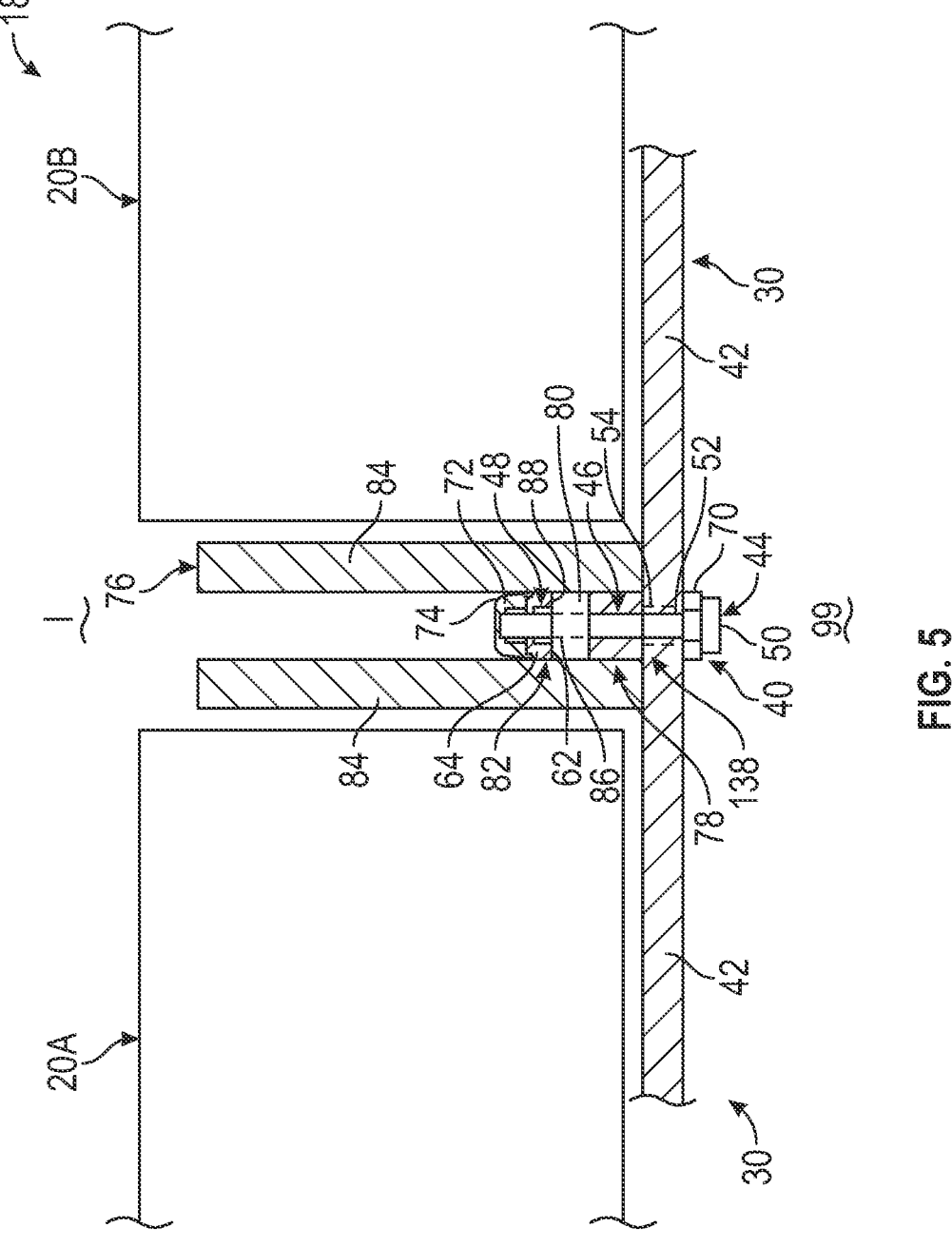
FIG. 5 illustrates another exemplary thermal insulating joint for use within a traction battery pack.

FIG. 5 illustrates another exemplary thermal insulating joint 138 that could be incorporated into a traction battery pack, such as the traction battery pack of FIG. 1, for example. In this embodiment, the thermal insulating joint 138 includes an enclosure tray 30, a cross member 76, and a fastener assembly 40 for securing the cross member 76 to a floor 42 of the enclosure tray 30. Accordingly, in this embodiment, the thermal insulating joint 138 is established between the floor 42 of the enclosure tray 30 and another type of battery internal component (e.g., the cross member 76).

The cross member 76 may be a relatively rigid structure arranged to add rigidity to the enclosure tray 30 and to establish mounting points for securing battery arrays 20 relative to the enclosure tray 30. The cross member 76 may be arranged to extend in parallel with either a longitudinal axis of the vehicle or in a cross-vehicle orientation. In an embodiment, the cross member 76 is disposed axially between a first battery array 20A and a second battery array 20B within the interior I of the traction battery pack 18. In another embodiment, the cross member 76 could be disposed axially between first and second rows of battery arrays 20.

The fastener assembly 40 may include a bolt 44, a first thermal insulation component 46, and a second thermal insulation component 48. The first thermal insulation component 46 may be positioned on a first side 78 of a beam 80 of the cross member 76, and the second thermal insulation component 48 may be positioned on a second side 82 of the cross member 76. The beam 80 may connect between vertical stanchion walls 84 of the cross member 76. The first side 78 may be closer to the floor 42 than the second side 82. Together, the first thermal insulation component 46 and second thermal insulation component 48 function to block the heat transfer path across the thermal insulating joint 138, thereby reducing or even eliminating absorption/dissipation of thermal energy from/to an ambient surrounding 99 of the traction battery pack 18.

The bolt 44 may include a head 50 and a shaft 52 that extends from the head 50. The shaft 52 may be received through a first opening 54 formed through the floor 42 of the enclosure tray 30 and a second opening 86 formed through the beam 80.

The first thermal insulation component 46 may be positioned between the floor 42 and the cross member 76 and may circumscribe a portion of the shaft 52 of the bolt 44. In an embodiment, the first thermal insulation component 46 is configured as a washer.

The second thermal insulation component 48 may be at least partially received within the second opening 86 of the beam 80 and may circumscribe another portion of the shaft 52 of the bolt 44. In an embodiment, the second thermal insulation component 48 is configured as a flanged collar that includes a collar portion 62 and a flange portion 64 that establish a stepped profile. The collar portion 62 may be received within the second opening 86, and the flange portion 64 may extend over top of a surface 88 of the beam 80 to help retain the position of the second thermal insulation component 48 within the second opening 86. However, other configurations are contemplated within the scope of this disclosure.

The fastener assembly 40 may further include a washer 70, a nut 72, and a cap 74. The washer 70 may be positioned between the head 50 of the bolt 44 and the floor 42. The nut 72 may be received over an end portion of the shaft 52 for securing the bolt 44 in place. The cap 74 may be received over portions of the shaft 52, the nut 72, and the second thermal insulation component 48 for further blocking the thermal transfer path across the thermal insulating joint 138.

The bolt 44 may be inserted across the thermal insulating joint 138 using a bottom-up approach. When inserted, the shaft 52 of the bolt 44 may be received through each of the washer 70, the floor 42, the first thermal insulation component 46, the beam 80 of the cross member 76, the second thermal insulation component 48, and the nut 72.

The exemplary traction battery packs of this disclosure incorporate thermal insulating joints that are designed to block the heat transfer path created by structural connections inside the battery pack. The thermal insulating joints therefore protect the battery internals during both relatively cold and relatively hot ambient conditions, thereby improving battery cell performance and life.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A thermal insulating joint for a traction battery pack, comprising:
   an outer enclosure assembly including an enclosure tray;
   a battery internal structure;
   a fastener assembly configured to mount the battery internal structure to the enclosure tray; and
   the fastener assembly includes a first thermal insulation component, a second thermal insulation component, a nut, and a bolt having a shaft received through each of the enclosure tray, the first thermal insulation component, the battery internal structure, the second thermal insulation component, and the nut.

2. The thermal insulating joint as recited in claim 1, wherein the battery internal structure is a heat exchanger plate that is arranged to thermally manage a battery array of the traction battery pack.

3. The thermal insulating joint as recited in claim 1, wherein the battery internal structure is a rigid cross member that is positioned between adjacent battery arrays of the traction battery pack.

4. The thermal insulating joint as recited in claim 1, wherein a head of the bolt is configured to interface with the enclosure tray.

5. The thermal insulating joint as recited in claim 4, wherein the fastener assembly includes a washer arranged between the head and the enclosure tray.

6. The thermal insulating joint as recited in claim 1, wherein the shaft of the bolt is secured by the nut of the fastener assembly.

7. The thermal insulating joint as recited in claim 6, wherein at least a portion of the shaft, the nut, and the second thermal insulation component is covered by a cap of the fastener assembly.

8. The thermal insulating joint as recited in claim 1, wherein the first thermal insulation component is positioned on a first side of the battery internal structure and the second thermal insulation component is positioned on a second side of the battery internal structure.

9. The thermal insulating joint as recited in claim 8, wherein the first thermal insulation component is a washer and the second thermal insulation component is a flanged collar, and further wherein the first thermal insulation component spaces the battery internal structure apart from a floor of the enclosure tray to establish an air gap therebetween.

10. The thermal insulating joint as recited in claim 1, wherein each of the first thermal insulation component and the second thermal insulation component includes an epoxy glass or a fluoro resin (PTFE).

11. A thermal insulating joint for a traction battery pack, comprising:
   an outer enclosure assembly including an enclosure tray;
   a heat exchanger plate;

a fastener assembly configured to mount the heat exchanger plate to a floor of the enclosure tray; and the fastener assembly includes a first thermal insulation component disposed on a first side of the heat exchanger plate, a second thermal insulation component disposed on a second side of the heat exchanger plate, a nut, and a bolt having a shaft received through each of the enclosure tray, the first thermal insulation component, the heat exchanger plate, the second thermal insulation component, and the nut.

12. The thermal insulating joint as recited in claim 11, wherein the first thermal insulation component is a washer and the second thermal insulation component is a flanged collar.

13. The thermal insulating joint as recited in claim 11, wherein the first thermal insulation component spaces the heat exchanger plate above the floor to establish an air gap therebetween.

14. The thermal insulating joint as recited in claim 11, wherein the fastener assembly includes a washer arranged between a head of the bolt and the floor.

15. The thermal insulating joint as recited in claim 11, wherein the nut is received over the shaft of the bolt.

16. The thermal insulating joint as recited in claim 15, wherein the fastener assembly includes a cap arranged to cover at least a portion of the shaft, the nut, and the second thermal insulation component.

17. The thermal insulating joint as recited in claim 11, wherein each of the first thermal insulation component and the second thermal insulation component includes an epoxy glass or a fluoro resin (PTFE).

18. The thermal insulating joint as recited in claim 1, wherein the first thermal insulation component and second thermal insulation component cooperate to block a heat transfer path across the thermal insulating joint and thereby insulate the battery internal structure from an ambient surrounding of the traction battery pack.

19. The thermal insulating joint as recited in claim 1, wherein each of the first thermal insulation component and the second thermal insulation component is comprised of plastic laminate materials that include low thermal conductivity fillers.

20. A thermal insulating joint for a traction battery pack, comprising:

an outer enclosure assembly including an enclosure tray;

a battery internal structure;

a fastener assembly configured to mount the battery internal structure to the enclosure tray; and the fastener assembly includes a first thermal insulation component, a second thermal insulation component, a bolt having a shaft received through each of the enclosure tray, the first thermal insulation component, the battery internal structure, and the second thermal insulation component, a nut secured to the shaft of the bolt, and a cap that covers at least a portion of the shaft, the nut, and the second thermal insulation component.

* * * * *